Sept. 25, 1945.    H. KERSHAW    2,385,710
APPARATUS FOR WELDING
Filed May 2, 1944    4 Sheets-Sheet 1
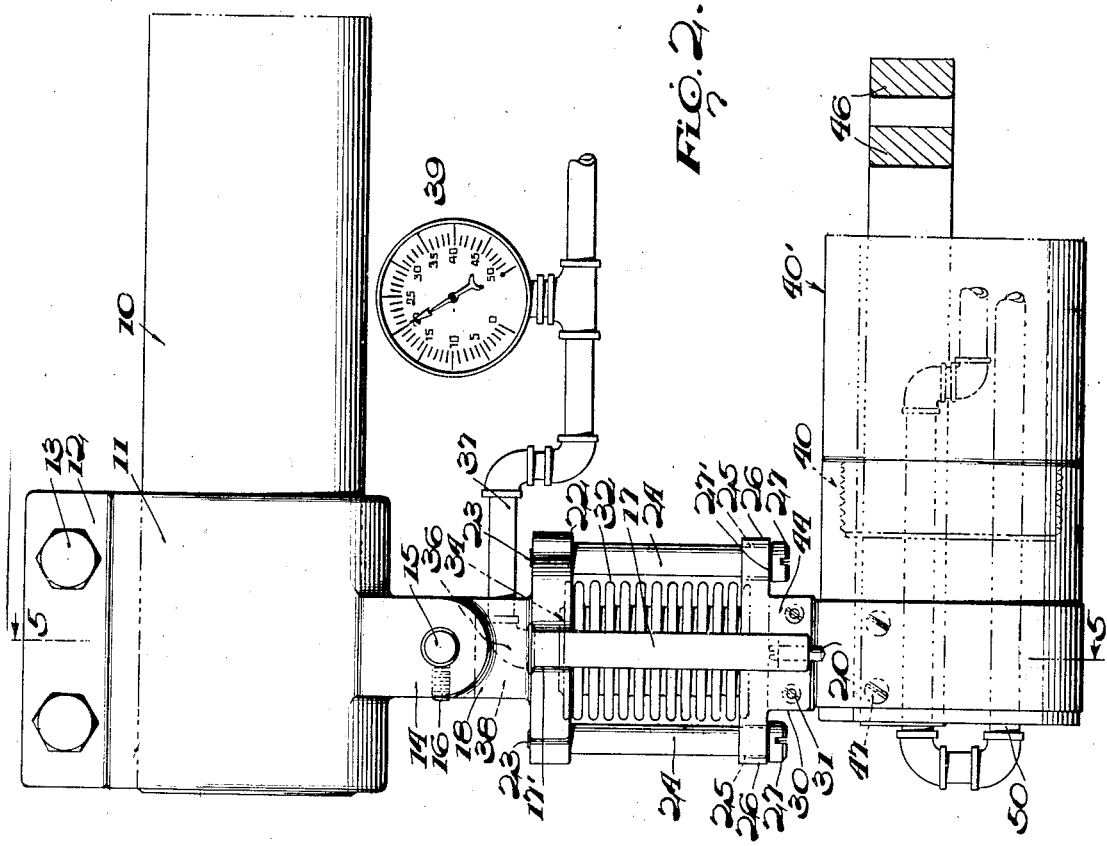
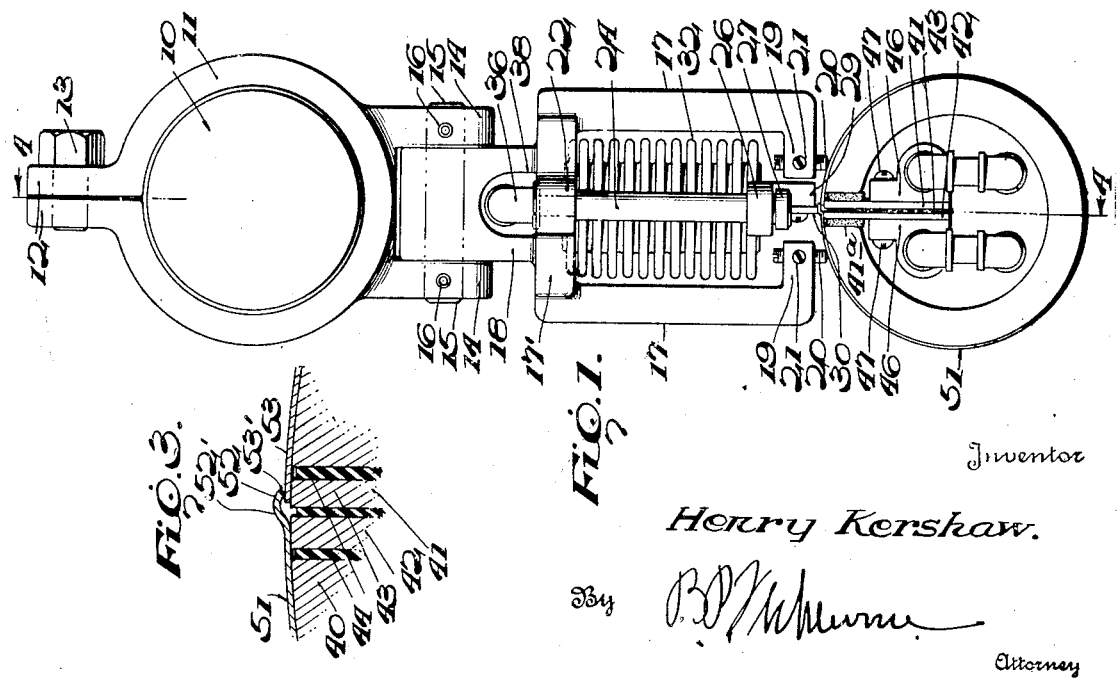
Inventor
Henry Kershaw.
By
Attorney Sept. 25, 1945. H. KERSHAW 2,385,710
APPARATUS FOR WELDING
Filed May 2, 1944 4 Sheets-Sheet 2
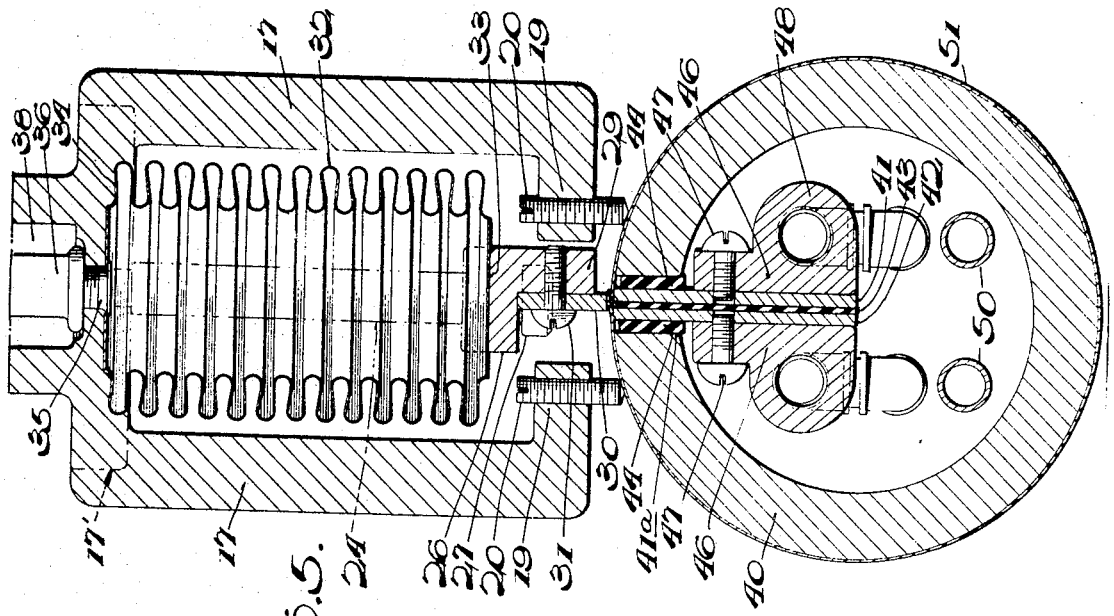
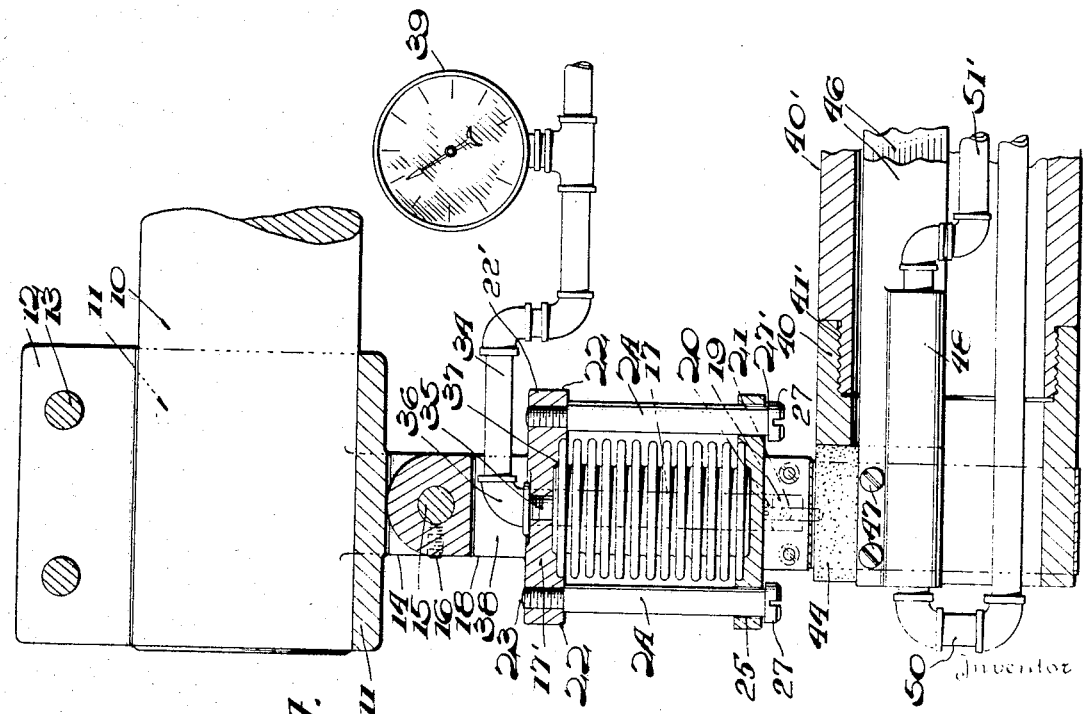
Inventor
Henry Kershaw
By
Attorney Sept. 25, 1945.  H. KERSHAW  2,385,710
APPARATUS FOR WELDING
Filed May 2, 1944  4 Sheets-Sheet 3
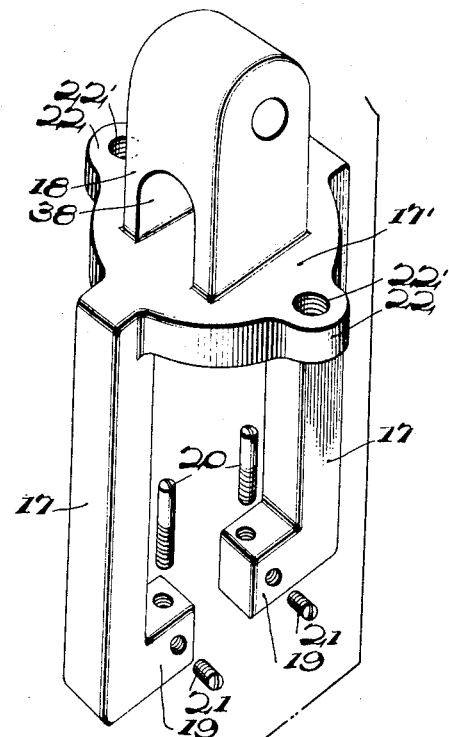
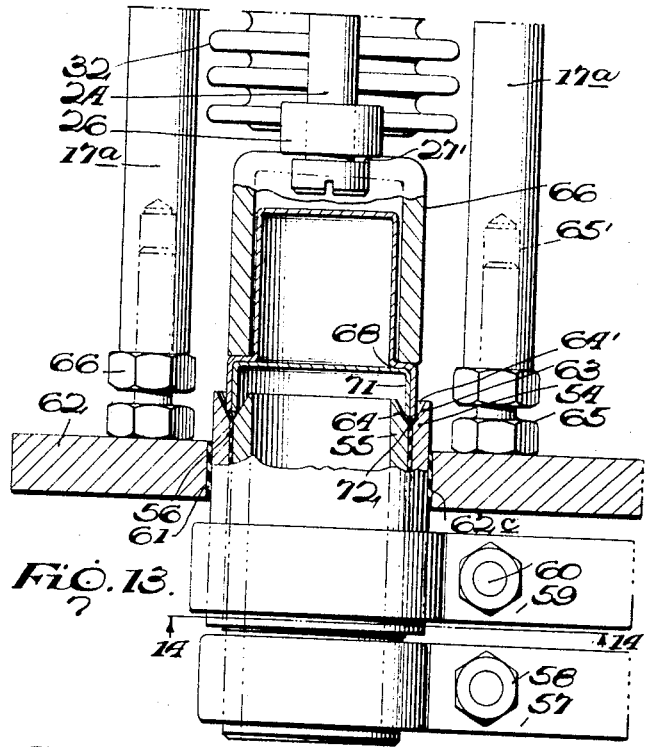
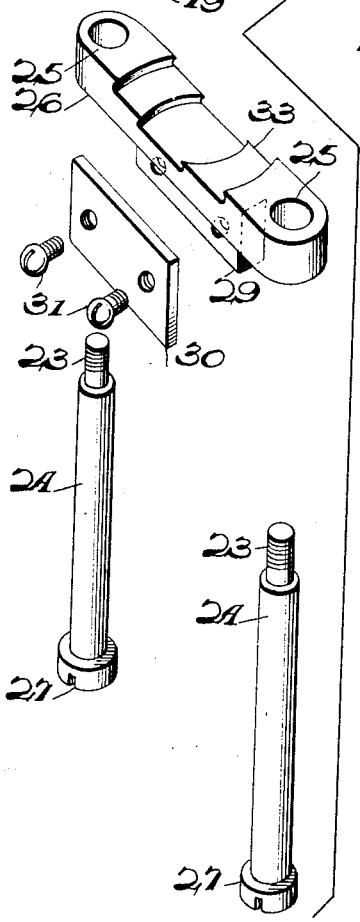
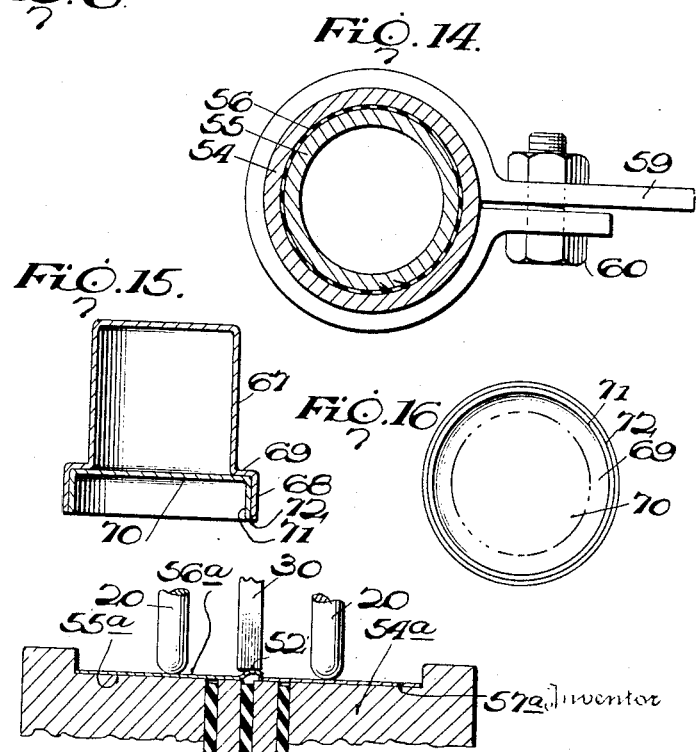

Sept. 25, 1945.　　　　H. KERSHAW　　　　2,385,710
APPARATUS FOR WELDING
Filed May 2, 1944　　　　4 Sheets-Sheet 4
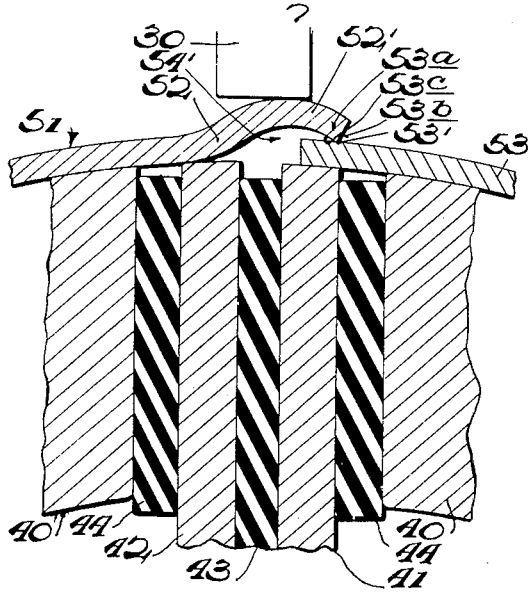
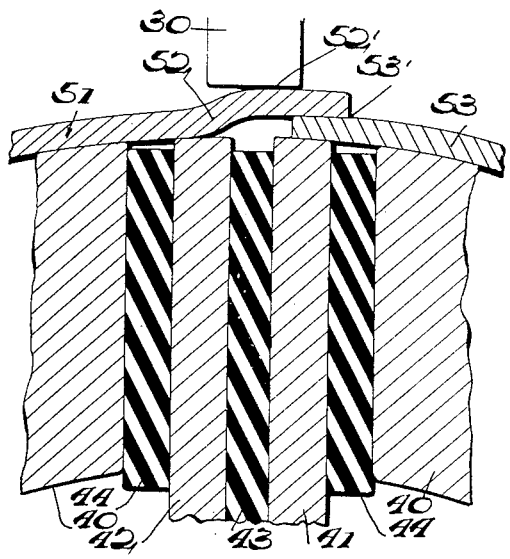
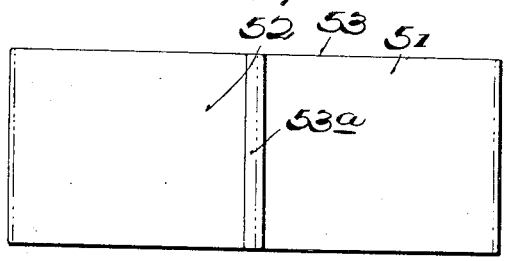
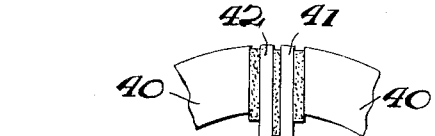
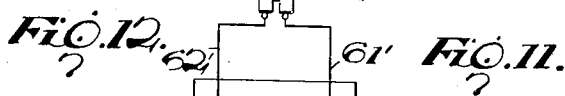
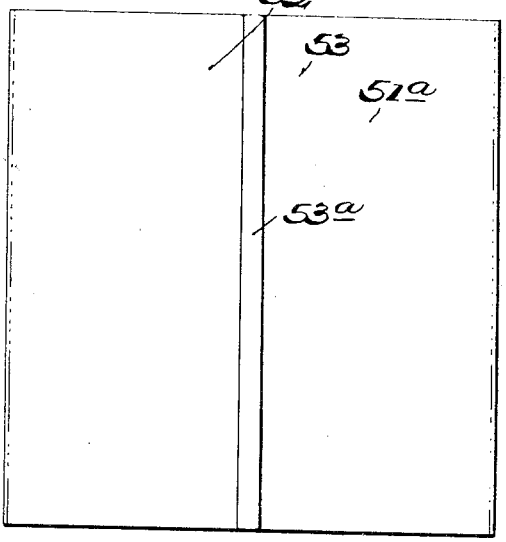
Inventor
Henry Kershaw.
By
Attorney Patented Sept. 25, 1945

2,385,710

UNITED STATES PATENT OFFICE 2,385,710

APPARATUS FOR WELDING

Henry Kershaw, Belleville, N. J.

Application May 2, 1944, Serial No. 533,719

14 Claims. (Cl. 219—4)

My invention relates to a method of and apparatus for welding.

An important object of the invention is to provide a method of the above mentioned character which will cause the pressure applied to the contacting parts to be welded, to follow through instantly, when such parts are plasticized due to the action of heat, without the delay produced from inertia.

A further object of the invention is to provide means for passing a welding current through contacting parts to be welded, with separate means to force the contacting parts together and to cause the pressure to follow through instantly when such parts are plasticized, without the delay produced from inertia.

A further object of the invention is to provide a method of the above mentioned character which is well adapted for producing a long weld.

A further object of the invention is to provide a knife edge upon one part and to bring the same in contact with the other part whereby the maximum resistance is created at the point of contact, for effecting a proper weld when the current is turned on.

A further object of the invention is to form an arch upon one part for providing a knife edge, and to apply a low pressure to the contacting parts, so that the arch will not be flattened prior to the formation of a proper weld.

A further object of the invention is to provide apparatus for the practice of the method and which will permit of the instant following through of the pressure, during the welding step, without the loss of time due to inertia.

A further object of the invention is to provide apparatus of the above mentioned character which will weld overlapping curved or flat sheets or sheet ends.

A further object of the invention is to provide apparatus which will weld parts which are telescoped, and will permit of the instantaneous following through of the pressure when the contacting parts plasticize.

Other objects and advantages of the invention will be apparent during the course of the following description.

In the accompanying drawings, forming a part of this application, and in which like numerals are employed to designate like parts throughout the same, Figure 1 is an end elevation of welding apparatus embodying my invention, Figure 2 is a side elevation of the same, Figure 3 is a transverse vertical section through the electrodes and associated elements, parts broken away, and upon an enlarged scale.

Figure 4 is a vertical longitudinal section taken on line 4—4 of Figure 1,

Figure 5 is a vertical transverse section taken on line 5—5 of Figure 2,

Figure 6 is an exploded perspective view of the vertically movable yoke and associated elements, Figure 7 is a further enlarged transverse section through the electrodes and sheet ends, at the starting of the welding step, Figure 8 is a similar view after the welding step, showing the arched portion flattened, Figure 9 is a plan view showing the welded joint of the metal strip, Figure 10 is a bottom plan view of the arch and bead shown in Figure 7, Figure 11 is a plan view of a welded sheet, having a greater width than the sheet shown in Figure 9 and forming a longer weld, Figure 12 is a diagrammatic view of a circuit included in the invention, Figure 12a is a vertical transverse section through a flat support or mandrel, embodying a modification of the invention, Figure 13 is an end elevation, parts broken away and parts in central vertical transverse section, of apparatus embodying a further modification of the invention, Figure 14 is a horizontal section taken on line 14—14 of Figure 13, Figure 15 is a central vertical transverse section through a metal tube and head, and, Figure 16 is a bottom plan view of the same.

In the drawings wherein for the purpose of illustration is shown a preferred embodiment of my invention, the numeral 10 designates an arm of a standard welding machine. This arm is pivotally mounted to swing in a vertical plane and is moved upwardly and downwardly by the conventional means. The arm 10 has a sleeve 11 mounted thereon near its free end. This sleeve is split at its top to provide ends 12, connected by bolts 13, whereby the sleeve is clamped to the arm 10. The sleeve 10 is provided upon its lower portion with a pair of spaced depending vertical knuckles 14, having inner faces arranged parallel with the plane of movement of the arm 10. The knuckles 14 are apertured for receiving a pintle 15, clamped to the knuckles 14 by set screws 16.

The numeral 17 designates spaced vertical arms, preferably formed integral with an upper horizontal head 17'. The head 17' is rigidly secured to a vertical knuckle 18, arranged above it. This knuckle is apertured to receive the pintle 15 and is arranged between the knuckles 14. The knuckle 18 is adapted to swing vertically in the plane of movement of the arm 10. At their lower ends, the arms 17 have inwardly facing horizontal extensions 19, having vertical screw threaded openings for receiving adjustable screws or stops 20, the free ends of which are rounded. Set screws 21 are provided to lock the screws or stops 20 in the selected adjusted position.

The head 17' has apertured knuckles 22 formed integral therewith, having vertical screw threaded openings 22' to receive reduced screw threaded extensions 23, formed integral with vertical guide rods 24. The vertical guide rods 24 are therefore rigidly attached to the head 17'. These guide rods extend through openings 25, formed in a transverse horizontal carriage 26. The carriage is therefore slidably mounted upon the guide rods 24 and these guide rods 24 are provided at their lower ends with heads 27, which prevent these parts from separating. The carriage 26 is provided with a horizontal attaching element or bar 29, preferably formed integral therewith, and this bar has a pressure bar 30 disposed upon one face of the same and attached thereto by screws 31 or the like.

The numeral 32 designates a pneumatic cell in the form of a metallic bellows. The lower end of the bellows 32 is seated in a recess 33 and anchored to the carriage 26. The upper end of the metallic bellows 32 is seated in a recess 34 formed in the head 17' and anchored to the head 17'. The lower end of the bellows 32 is closed, while its upper end is equipped with a tube 35, having screw threaded connection with a coupling 36, connected with a pipe 37. The coupling 36 is mounted within an opening 38 formed in the knuckle 18. The pipe 37 swings vertically with the arm 10 and has connection with a source of air pressure by means of a flexible tube or coupling. The pipe 37 has a pressure gage 39.

The numeral 40 designates a stationary tubular mandrel, preferably of metal, and secured to a stationary horizontal arm 40', preferably by a screw threaded connection, as shown at 41'. The tubular mandrel 40 is horizontally arranged directly beneath the arm 10 and extends longitudinally thereof. The tubular mandrel 40 is provided with a longitudinal slot 41a, for receiving vertically arranged electrodes 41 and 42, having insulation 43 arranged between them. These welding electrodes 41 and 42 have insulation 44 arranged between them and the tubular mandrel 40. The electrodes 41 and 42 are rigidly connected with each other and are rigidly attached to the tubular mandrel 40. The upper ends of the electrodes 41 and 42 are substantially flush with the periphery of the mandrel 40. The electrodes 41 and 42 have a width extending throughout the entire desired length of the weld to be produced. The electrodes 41 and 42 extend radially inwardly and enter the tubular mandrel 40 and are connected therein with bus-bars or leads 46, by means of clamping screws 47. These bus-bars are connected with the opposite poles of a welding source of current. The bus-bars 46 have tubular extensions 48, extending longitudinally thereof and arranged adjacent to the electrodes 41 and 42. A pipe 50 leads into one end of the bore of the tubular extension 48, while a pipe 51' leads into the opposite end of the bore. A coolant is circulated through each tubular extension 48 to retain the adjacent electrode suitably cooled.

The numeral 51 designates a metallic strip having ends 52 and 53 to be welded. The metallic strip is applied to the mandrel 40 and its ends 52 and 53 are arranged in overlapping relation. The end 52 is longitudinally bent or crimped, to provide an arched portion 52', having a sharp corner 53'. The corner or edge 53' engages with the upper surface of the end 53, as shown.

The numeral 54b designates a wire having connection with the positive side of a welding source of current, and connected with one terminal of a switch 55'. The other terminal of the switch 55' is connected with a wire 56', connected with the primary coil of a transformer 57', and the opposite end of the primary coil is connected with a wire 58', having a time controlled switch 59' connected therein. Wire 58' is connected with wire 60', which leads to the negative pole of the welding source of current. A wire 61' is connected with one pole of the secondary coil of the transformer 57' and is connected with the electrode 41, while the electrode 42 is connected with a wire 62' connected with the opposite terminal of the secondary coil.

The use of apparatus and the practice of the method are as follows:

When the arm 10 is in the raised position, the stops 20 are spaced from the mandrel 40, and the iron or metal strip 51 is applied to the mandrel. This metal strip is ordinarily first bent into a cylindrical form. The arched portion 52' extends longitudinally of the end 52 and is previously formed by bending the end. The arched portion 52' provides a depending bead 53a, having inwardly or downwardly converging faces 53b and 53c, forming a sharp or knife edge 53'. The arched portion 52' extends over the end 53 and its knife edge 53' engages the end 53 and there is a space 54'. The ends 52 and 53 are retained in the overlapping relation and the arm 10 is swung downwardly, and when this is done the stops 20 engage the metal strip 51, clamping it in place upon the mandrel and pressing the ends 52 and 53 together, and also limit the downstroke of the arm 10. The pressure unit including the arms 17, being pivotally supported by the pintle 15, remains vertical during the swinging movement of the arm 10. The pressure element 30 engages the arched portion 52', and the pneumatic cell 32 yields upwardly, providing a space 27' between the carriage 26 and the heads 27. The pneumatic cell 32 is under a suitable pressure, and this is preferably a low pressure of from 10 pounds to 20 pounds per square inch. This pressure is transmitted to the pressure element 30, which forces the arched portion 52' toward the end 53. The bead 53a extends throughout the entire length of the end 52 or the entire width of the sheet 51, Figure 10. Before the welding circuit is closed, the low pressure is not sufficient to flatten the arched portion 52', Figure 7, but presses the knife edge 53' into firm engagement with the end 53. The welding circuit is now closed at the switch 55', and the time controlled switch 59' is also closed. In this closed welding circuit, current will pass through wire 54b, switch 55', wire 56', primary coil of transformer 57', wire 58', time controlled switch 59', and through wire 60' to the opposite pole of the source of current. The current is induced in the secondary winding of the transformer, and passes through wire 61', electrode 41, end 53, the knife edge 53', arched portion 52', electrode 42, and through wire 62' to the opposite terminal of the secondary winding. The alternating current is applied to the electrodes 41 and 42, and has a low voltage, such as around 3 volts, with a high amperage of about 4,000 to 5,000 amps., although the amperage may be varied. I have preferably used a low pressure and I have found that a pressure of 10 to 20 pounds per square inch in the pneumatic cell 32, is satisfactory. This low pressure will not flatten out the arched portion 52' before the welding is effected. The arched portion 52' is a simple means for providing the knife edge 53' in contact with the face of the end 53, effecting the maximum resistance at the point of welding. The low pressure also permits the welding operation by the use of a current of less amperage and with a fixed voltage. The welding circuit remains closed for the welding period, which is ordinarily from 1 to 2 cycles, and is opened by the time-controlled switch 59', while the switch 55' is closed, but subsequently opened. When the welding circuit is closed, the welding occurs primarily at the contact between the knife edge 53' and the face of the end 53 and these parts are plasticized. The pressure instantaneously follows through when the contacting parts are plasticized, during the welding process, without the delay due to inertia. As the welding proceeds, the arched portion 52' is heated and rendered more pliable, and the pressure element 30 fflattens out the arched portion, Figure 8. The action of the cell 32 is independent of the arms 17, which are then stationary.

In Figure 9, I have shown the completed welded joint, the strip 51 being removed from the mandrel. The strip 51 with its welded joint may constitute the body portion of a can. The welded joint may be of a greater length, as shown in Figure 11. The numeral 51a designates an iron or metal strip corresponding to the strip 51, and being much wider and providing a longer weld.

In Figure 12a I have shown a modification of the invention, wherein a flat metal support 54a is provided, having a recess 55a, for receiving flat metal sheets 56a and 57a, corresponding to the sheet ends of the sheet 51. The same arched portion 52' is formed upon the sheet 56a. The same electrodes 41 and 42 are used and the same pressure element 30. All of the parts remain identical with those shown and described in connection with the first form of the invention, and the method practiced is identical.

In Figures 13 to 16 inclusive, I have shown a modification of the invention. In these figures the numerals 54 and 55 designate cylindrical tubular electrodes, which telescope, and are insulated from each other by insulating material 56 arranged between them. These tubular electrodes are rigidly secured together and are thoroughly insulated from each other and are vertically arranged. The inner tubular electrode 55 is longer than the outer tubular electrode 54 and projects downwardly beyond the same and has a bus-bar or lead 57 clamped thereto by means of a bolt 58, while the outer tubular electrode 54 has a companion bus-bar 59 clamped thereto by a bolt 60. These bus bars are connected with the opposite poles of the welding source of current. The assembled electrodes 54 and 55 extend through an opening 61 formed in a stationary table 62 and are insulated from the table 62, as shown at 62c, and are rigidly attached to the table. At their upper ends, the tubular electrodes 54 and 55 have inclined or beveled faces 63 and 64 respectively. These beveled faces converge downwardly and form an annular groove 64', which is V-shaped in cross section and tapers downwardly. The numeral 17a designates vertical arms corresponding to the arms 17. At their lower ends, the vertical arms 17a have adjustable bolts or stops 65 engaging within screw threaded openings 65', and locked in the selected adjusted position by lock nuts 66. The arms 17a engage the table top 62 and limit the downward movement of such arms and associated elements. The pressure element 30 and attaching bar 29, Figure 5, are omitted and a cup or socket 66 is substituted for the element 30 and is rigidly attached to the carriage 26. The same guide rods 24 are employed for the carriage 26. The same pneumatic cell 32 and associated elements are used. It is obvious that the table top 62 has been substituted for the mandrel 40 and the tubular electrodes 54 and 55 substituted for the electrodes 41 and 42. All of the parts remain identical with those shown and described with the first form of the invention, except as indicated.

The numeral 67 designates the metal tube of a radio tube, having an enlarged skirt or flange 68, forming a shoulder 69. The numeral 70 designates a metal closure or and, having an annular skirt or flange 71. The skirt 71 telescopes the skirt 68.

In the practice of the method, the assembled telescoping skirts 68 and 71 are positioned within the annular groove 64', and are supported by the downwardly converging beveled faces 63 and 64. The vertical arms 17a and associated elements are moved downwardly by swinging the arm 10 downwardly until the stop elements 65 contact with the table top 62. The socket 66 receives the tube 67 and exerts a downward pressure upon the tube and end 70, the pressure being caused by the pneumatic cell 32 which is now compressed, providing the space or clearance 27'. The leads 57 and 59 correspond to the wires 61' and 62' and hence the tubular electrodes 54 and 55 are connected with the opposite poles of the same source of welding current. The welding circuit is closed and remains closed for from 1 to 2 cycles. The inclined faces 63 and 64 press the skirts 68 and 71 together, and this pressure is more pronounced at about the point 72. The welding occurs principally at about the point 72, and when the skirts 68 and 71 are plasticized at about the point 72, the skirts are further moved together by the action of the inclined faces 63 and 64 and the downward pressure of the cup 66 from the pneumatic cell 32. The pressure moving the skirts 68 and 71 together instantly follows through, without the loss of time due to inertia, during the welding period. The carriage 26 and cup or socket 66 are relatively light, and hence the pneumatic cell 32 causes the pressure to instantly follow through, during the welding period, without the loss of time due to inertia. The same pressure of from 10 to 20 pounds is had within the pneumatic cell 32, and the same alternating current of low voltage, such as around three volts, with about 4,000 to 5,000 amps. are employed, for the reasons stated in connection with the first form of the invention. The same circuit shown in Figure 11 may be employed, with the tubular electrodes 54 and 55 substituted for the electrodes 41 and 42, and leads 57 and 59 substituted for wires 61' and 62'.

It is to be understood that the forms of my invention herewith shown and described are to be taken as preferred examples of the same, and the various changes in the shape, size, and arrangement of parts may be made in the apparatuses, and that changes may be made in the order of

Having thus described my invention, I claim:

1. In welding apparatus, a support, electrodes carried by said support and insulated from each other, one electrode engaging one part and the other electrode the other part, a welding circuit connected with the electrodes, a pressure element separate from the electrodes and engaging one part, and a pneumatic cell to cause the pressure element to instantly follow thru without the delay caused by inertia.

2. In welding apparatus, insulated electrodes engaging contacting parts to oppose their movement in one direction, a welding circuit connected with the electrodes, a pressure element separate from the electrodes and engaging one part to urge said parts toward the electrodes, and a pneumatic cell acting upon the pressure element to cause the pressure element to instantly follow thru without the delay caused by inertia.

3. In welding apparatus, a support for parts to be welded, said parts overlapping, insulated electrodes arranged adjacent to said support upon one side of said parts, one electrode engaging one part and the other electrode the other part, a welding circuit connected with the electrodes, a pressure element separate from the electrodes and disposed upon the opposite side of said parts remote from the electrodes and engaging one part to press the parts together, and a pneumatic cell connected with the pressure element to cause the pressure element to instantly follow thru without the delay caused by inertia.

4. In welding apparatus, a support for parts to be welded, said parts overlapping, said support having an opening arranged upon one side of said parts, electrodes arranged within the opening, one electrode engaging one part and the other electrode the other part, a welding circuit connected with the electrodes, a device movable with relation to said support and adapted to engage one part at a point spaced from the overlapping portions of said parts, a pressure element separate from the electrodes to engage the overlapping portions of said parts, and a pneumatic cell carried by said device, said cell being adapted to move the pressure element with relation to the device and cause the pressure element to instantly follow thru without the delay caused by inertia.

5. In welding apparatus, a stationary support to receive thereon parts to be welded having overlapping portions, said support having an opening beneath said overlapping parts, insulated electrodes within the opening and beneath the parts, one electrode engaging one part and the other electrode engaging the other part, a member movable downwardly toward the support to engage with said parts at points spaced from the overlapping portions, a pressure element separate from the electrodes to engage with the overlapping portion of one part, and a pneumatic cell secured to said member and having its free end acting upon the pressure element to move the pressure element with relation to the member and cause the pressure element to instantly follow thru without the delay caused by inertia.

6. In welding apparatus, a generally cylindrical stationary mandrel having an opening formed therein, insulated electrodes extending into the opening and having their outer ends substantially flush with the periphery of the mandrel, a welding circuit connected with the electrodes, the mandrel being adapted to receive thereon a metal band having its ends overlapping adjacent to the electrodes, the arrangement being such that one electrode engages one end of the band and the other electrode engages the opposite end of the band, a member movable downwardly toward the mandrel, a yoke carried by the member and having parts to engage with the band at points spaced from the electrodes, a pneumatic cell attached to the yoke, guide rods carried by the yoke, a carriage slidable upon the guide rods and engaging the free end of the pneumatic cell, and a pressure element secured to the carriage to engage one end of the metal band, the pressure element being movable with relation to the yoke.

7. In welding apparatus, a tubular stationary mandrel having an opening formed therein, stationary insulated electrodes arranged within the opening and extending into the tubular mandrel, bus-bars secured to the electrodes and having tubular parts, means to supply a coolant to the tubular parts, a member movable downwardly toward the mandrel, spaced arms carried by the member, adjustable stop elements secured to the arms and arranged to engage a band arranged upon the mandrel, said band having its ends overlapping, guide rods connected with the arms, a pneumatic cell secured to the arms, a carriage connected with the free end of the pneumatic cell and slidable upon the guide rods, the carriage being movable with relation to the arms, and a pressure element secured to the carriage and arranged to engage one overlapping end of the band.

8. In welding apparatus, a stationary support for the elements to be welded, said elements having overlapping ends, insulated electrodes to engage the elements, a member movable toward the support, a device carried by the member and including adjustable stops to engage with the elements and limit the movement of the device toward the support, a pneumatic cell attached to the device to move bodily therewith and having a free end, guide rods secured to the device, a carriage mounted upon the guide rods and moved by the free end of the pneumatic cell, and a pressure element attached to the carriage and engaging one overlapping end.

9. In welding apparatus, an outer tubular electrode, an inner electrode within the outer tubular electrode, at least one electrode having a beveled face to provide a groove which tapers towards one end, means for connecting the electrodes with a welding source of current, said groove being adapted to receive telescoping parts to be welded, a pressure element to engage one part, and means to effect a relative movement between the pressure element and the electrodes.

10. In welding apparatus, an outer tubular electrode, an inner electrode arranged within the outer tubular electrode and insulated from the same, at least one electrode having a beveled face at its end to provide a groove tapering to its bottom, the groove being adapted to receive telescoping parts to be welded, a pressure element engaging one part to shift the same axially toward the tubular electrodes, a pneumatic cell connected with the pressure element to move it toward the tubular electrodes, and a supporting member having the cell attached thereto, said supporting member being movable to shift the cell toward the tubular electrodes.

11. In welding apparatus, an outer stationary tubular electrode, an inner stationary electrode arranged within the outer tubular electrode and insulated from the same and adapted for connection with a source of welding current, the electrodes being provided with beveled faces forming a groove which tapers toward one end, said groove being adapted to receive telescoping parts to be welded, a pressure element engaging one part, and means to effect a relative movement between the pressure element and the electrodes.

12. In welding apparatus, electrodes which are insulated from each other and adapted for connection with a source of welding current, the electrodes engaging parts to be welded, means separate from the electrodes to press the parts toward the electrodes, said means including a pneumatic cell to cause the pressure to instantly follow through without the loss of time due to inertia.

13. In welding apparatus, insulated electrodes, a pressure element for coaction with the electrodes, a pneumatic cell connected with the pressure element to shift the same toward the electrodes, a member movable toward the electrodes and carrying the pneumatic cell and serving to shift the same bodily toward the electrodes, and means to move the member.

14. In welding apparatus, opposed electrodes, at least one electrode having a beveled face, the parts to be welded being arranged between the opposed electrodes and one part engaging the beveled face, means separate from the electrodes to move the part engaging the beveled face axially of the beveled face so that such parts are pressed together, said means including a pneumatic cell to cause the pressure to instantly follow through without the loss of time due to inertia, and a welding circuit connected with the opposed electrodes.

HENRY KERSHAW.